(12) United States Patent
Meacham, II et al.

(10) Patent No.: US 10,291,052 B2
(45) Date of Patent: May 14, 2019

(54) BYPASS CHARGING CIRCUIT AND METHOD

(71) Applicant: FAIRCHILD SEMICONDUCTOR CORPORATION, Sunnyvale, CA (US)

(72) Inventors: James A. Meacham, II, Gorham, ME (US); Karttikeya Shah, Fremont, CA (US)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 124 days.

(21) Appl. No.: 15/582,988

(22) Filed: May 1, 2017

(65) Prior Publication Data

US 2017/0346328 A1   Nov. 30, 2017

Related U.S. Application Data

(60) Provisional application No. 62/341,454, filed on May 25, 2016.

(51) Int. Cl.
  *H02J 7/00*      (2006.01)
(52) U.S. Cl.
  CPC .......... *H02J 7/0083* (2013.01); *H02J 7/0029* (2013.01); *H02J 7/0031* (2013.01); *H02J 7/0045* (2013.01); *H02J 7/0047* (2013.01); *H02J 7/0077* (2013.01); *H02J 7/0081* (2013.01)

(58) Field of Classification Search
  USPC .......................................... 320/116–121, 163
  See application file for complete search history.

(56) References Cited

U.S. PATENT DOCUMENTS

| 7,459,887 | B2 * | 12/2008 | Hatanaka | ......... G01R 19/16571 320/162 |
| 2006/0132140 | A1 * | 6/2006 | Weber | .............. G01R 19/16542 324/433 |
| 2008/0136264 | A1 * | 6/2008 | Yoshida | ................ H02J 7/0052 307/80 |
| 2008/0150483 | A1 * | 6/2008 | Morita | .................... H02J 9/061 320/122 |

* cited by examiner

*Primary Examiner* — Samuel Berhanu
(74) *Attorney, Agent, or Firm* — Rennie William Dover

(57) ABSTRACT

In accordance with an embodiment, a bypass charging circuit includes a pair of transistors having current carrying terminals commonly connected to form a node. An input of a comparator is coupled to the node through a switch and to a resistor. Another input terminal of the comparator is coupled for receiving a reference voltage. Optionally, a transistor may be connected to the bypass charging circuit. In accordance with another embodiment a method is provided in which bypass charging transistors are coupled to first input of a comparator in response to closing a switch. A voltage is generated at the first input of the comparator in response to closing the switch and the voltage is compared with a reference voltage. In response to the comparison, a status indicator signal is generated to indicate the presence of a low-impedance failure in one or both of the bypass charging transistors.

20 Claims, 6 Drawing Sheets

BYPASS CHARGING CIRCUIT AND METHOD

The present application is a nonprovisional application of provisional application having U.S. Patent Application No. 62/341,454 filed on May 25, 2016, by James Meacham et al., titled "BYPASS CHARGING SWITCH FAILURE DETECTION" which is hereby incorporated by reference in its entirety, and priority thereto for common subject matter is hereby claimed.

FIELD OF THE INVENTION

The present invention relates, in general, to electronics and, more particularly, to circuits used with batteries and methods.

BACKGROUND

In the past, battery charging systems in mobile devices such as, for example, mobile phones, computers, personal digital assistants, etc. have used linear or switching chargers to charge the batteries that power these devices. Recently, battery charging systems have included a bypass path that contains one or more switches in conjunction with setting limits on current, voltage, or both, using one or more communication channels between a mobile device and a travel adapter. Including the bypass path reduces the amount of heat dissipated by the mobile device. A drawback with using switches in the bypass path is that one or more of the switches may fail and introduce a low impedance path from the input node to the battery. Formation of this low impedance path is undetectable until the circuit or the battery becomes damaged.

Accordingly, it would be advantageous to have a semiconductor component and method for detecting whether a low impedance path from the input node to the battery in a battery charging system has been created and to have a method and structure for protecting against damage caused by the low impedance path. It would be of further advantage for the semiconductor component and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
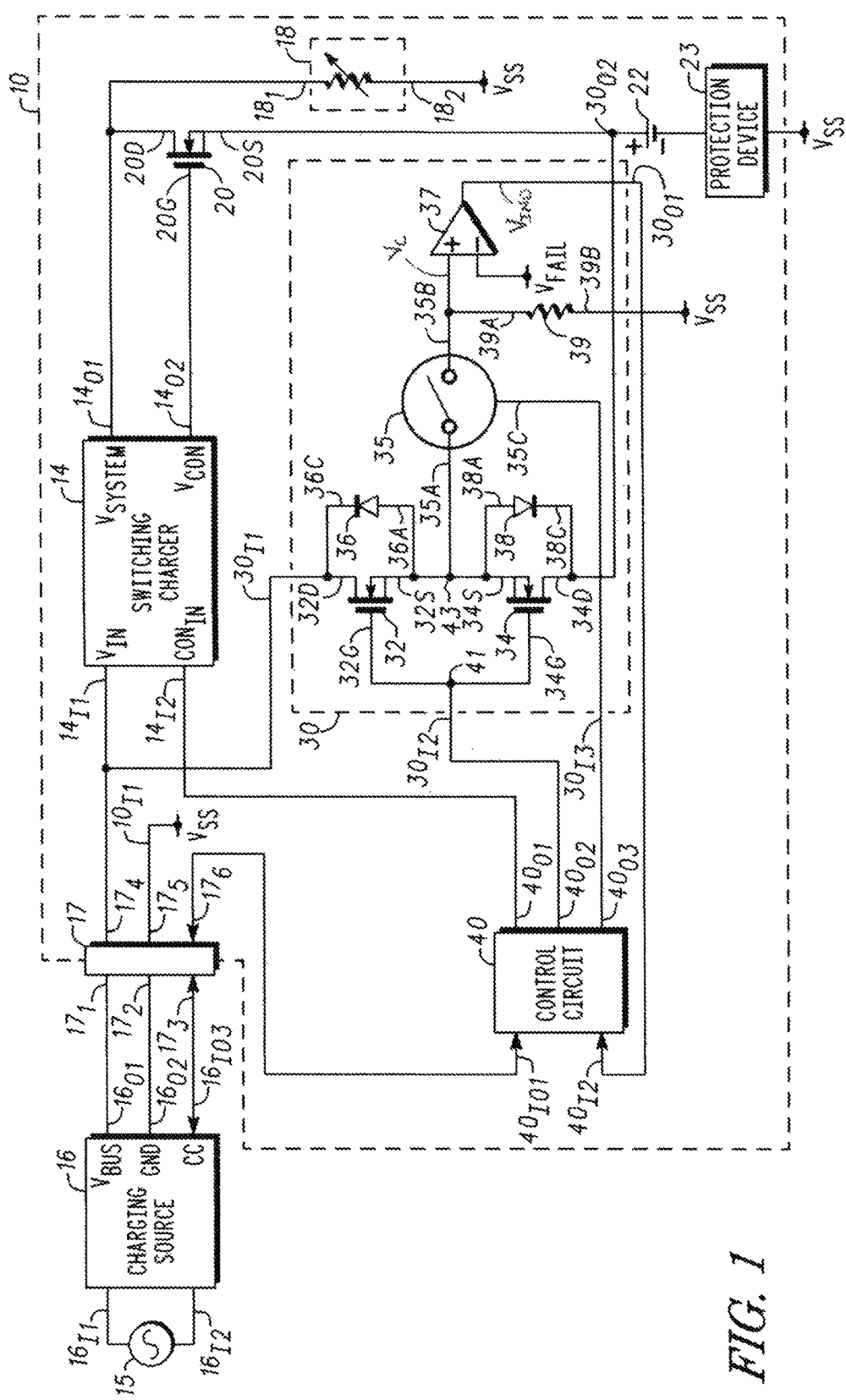
FIG. 1 is a schematic diagram of a bypass charging circuit having a failure detection section in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of being exactly as described.

It should be noted that a logic zero voltage level ($V_L$) is also referred to as a logic low, a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high, a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally, the present invention provides a circuit and method for detecting a low-impedance failure of one or more transistors in a charging bypass circuit. In accordance with an embodiment, a failure detection circuit is provided that comprises a bypass circuit coupled to a control circuit. In one aspect, the charging bypass circuit comprises a pair of charging bypass transistors having current carrying terminals that are commonly connected to form a node 43. A comparator 37 has a noninverting input coupled to node 43 and an inverting input coupled for receiving a reference voltage. A resistor is connected between a source of operating potential and the noninverting input of comparator 37.

In accordance with an aspect, the noninverting input of comparator 37 is coupled to node 43 through a switch.

In accordance with another aspect, the noninverting input of comparator 37 is directly connected to node 43.

In another aspect, a protection transistor 60 is coupled to a current carrying terminal of one of the pair of bypass charging transistors.

In accordance with another aspect, the control terminals of the pair of bypass charging transistors are commonly connected together.

In accordance with another embodiment, a method for detecting failure of a bypass charging circuit is provided in which bypass charging transistors are coupled to a first input of a comparator in response to closing a switch. A voltage is developed at the first input of the comparator in response to closing the switch and compared with a reference voltage. A comparison voltage is generated at the output of the comparator in response to comparing the voltage at the input with the reference voltage, where the comparison voltage serves as a status indicator signal. The status indicator signal indicates whether the bypass charging circuit has failed or whether it can be used to charge a battery.

In accordance with another embodiment, a method for detecting failure of a bypass charging circuit is provided in which current carrying terminals of first and second transistors are connected to form a node. A switch is closed in response to a control signal to couple the node to an input of a comparator and a voltage is generated at the input of the comparator. The voltage at the input of the comparator is compared with a reference voltage at another input of the comparator to generate a comparison voltage at the output of the comparator. The comparison voltage is used to determine whether the bypass charging circuit has failed.

FIG. 1 is a circuit schematic of a battery powered device 10 comprising a bypass charging circuit 30 that includes a failure detection section in accordance with embodiments of the present invention. Bypass charging circuit 30 is connected to a control circuit 40 and can be used to detect low impedance paths that damage batteries. Bypass charging circuit 30 can be configured to protect battery powered devices such as, for example, mobile phones, cameras, laptop computers, personal digital assistants, electronic readers, notebooks, clocks, smart watches, virtual reality headsets, other wearable devices, etc. What is shown in FIG. 1 is bypass charging circuit 30 configured for use in battery powered device 10. By way of example, battery powered device 10 may include a switching charger 14, bypass charging circuit 30, and a control circuit 40. Control circuit 40 is connected to switching charger 14 and to bypass charging circuit 30 and has an input/output (I/O) terminal $40_{IO1}$ connected to a charging source 16. Charging source 16 may be a travel adapter (TA) configured to receive an Alternating Current (AC), a battery in combination with a Direct Current (DC) to DC converter, a battery pack, or the like. Charging source 16 may be referred to as a power source, a travel adapter, or the like. In accordance with an embodiment, charging source 16 may be a travel adapter having inputs $16_{I1}$ and $16_{I2}$, outputs $16_{O1}$, and $16_{O2}$, and an input/output terminal (I/O) $16_{IO3}$. Inputs $16_{I1}$ and $16_{I2}$ are coupled for receiving an AC signal from an AC source 15, output $16_{O1}$ is configured for transmitting an input signal Vin to an input $14_{I1}$ of switching charger 14 and to input $30_{I1}$ of bypass circuit 30, output $16_{O2}$ is configured to be connected to an input $10_{I1}$ of battery powered device 10, and input/output terminal $16_{IO3}$ is connected to input/output terminal $40_{IO1}$ of controller 40 and configured as a communications channel for transmitting and receiving communications signals between charging source 16 and control circuit 40. Although output $16_{O1}$ is described as being configured for transmitting an input signal $V_{IN}$ to input $14_{I1}$ of switching charger 14 and input $30_{I1}$ of bypass circuit 30, this is not a limitation of the present invention. For example, output $16_{O1}$ may be configured for transmitting an input signal $V_{IN}$ to input $14_{I1}$ or to input $30_{I1}$ of bypass circuit 30. Signals can be transmitted from charging source 16 to control circuit 40 and from control circuit 40 to charging source 16. It should be appreciated that in mobile applications, outputs $16_{O1}$, $16_{O2}$, and $16_{IO3}$ may be connections in a Universal Serial Bus (USB) Type C connector, where output $16_{O1}$ may be identified as a $V_{BUS}$ output, output $16_{O2}$ may be identified as a terminal for receiving operating potential $V_{SS}$, and input/output $16_{IO3}$ may be identified as a communications channel (CC). Operating potential $V_{SS}$ may be a ground potential. Charging source 16 is not limited to being a travel adapter and the communications standard between charging source 16 and battery powered device 10 is not limited to being a USB standard.

Battery powered device 10 may include a connector 17 having external ports $17_1$, $17_2$, and $17_3$ and internal ports $17_4$, $17_5$, and $17_6$, where external port $17_1$ is electrically connected to internal port $17_4$, external portion $17_2$ is electrically connected to internal port $17_5$, and external port $17_3$ is electrically connected to internal port $17_6$. Connector 17 may be a connector compatible with a USB standard.

Switching charger 14 has outputs $14_{O1}$ and $14_{O2}$, where output $14_{O1}$ is coupled to a battery 22 through a transistor 20 and to a load 18. Transistor 20 has a control terminal 20G and current carrying terminals 20D and 20S and load 18 has terminals $18_1$ and $18_2$. Current carrying terminal 20D of transistor 20 is connected to output $14_{O1}$ of switching charger 12, control terminal 20G of transistor 20 is connected to output $14_{O2}$ of switching charger 40, and current carrying terminal 20S of transistor 20 is connected to a positive side electrode or terminal of battery 22. Current carrying terminal 20S may be referred to as a current carrying electrode, a source terminal, a source electrode, a current conduction electrode, or a current conduction terminal; current carrying terminal 20D may be referred to as a current carrying electrode, a drain electrode, a drain terminal, a current conduction electrode, or a current conduction terminal; and control terminal 20G may be referred to as a gate terminal or a gate electrode. It should be appreciated transistor 20 may be monolithically integrated with switching charger 14 or is may be an external component that is connected to switching charger 14.

By way of example, load 18 is a variable resistance load having a terminal $18_1$, which is connected to output $14_{O1}$ and a terminal $18_2$ coupled for receiving a source of operating potential such as operating potential $V_{SS}$. By way of example, operating potential $V_{SS}$ is a ground potential. Although load 18 is shown as a variable resistance load, this is not a limitation. For example, load 18 may be a variable current source, a variable voltage source, an impedance, a load that varies, or the like.

The negative side electrode or terminal of battery 22 is coupled for receiving, for example, source of operating potential $V_{SS}$. By way of example, the negative side electrode or terminal of battery 22 is coupled for receiving source of operating potential $V_{SS}$ through a protection device such as, for example, protection device 23. The configuration shown in FIG. 1 may be referred to as having protection on the low side or low side protection. Alternatively, a protection device may be connected between output terminal $30_{O2}$ and the positive side electrode or terminal of battery 22 to provide protection on the high side or high side protection. It should be appreciated that the protection device 23 may protect battery 22 or circuitry connected to the negative side electrode or terminal of battery 22. Protection device 23 protects battery 22 from an overvoltage, an undervoltage, being over charged, or being under discharged.

By way of example, the bypass charging circuit 30 is connected to control circuit 40 and has an input $30_{I1}$, an input $30_{I2}$, and input $30_{I3}$, an output $30_{O1}$, and an output $30_{O2}$ and control circuit 40 has an input/output terminal $40_{IO1}$, an input terminal $40_{I2}$, and output terminals $40_{O1}$, $40_{O2}$, and $40_{O3}$. By way of example, input/output terminal $40_{IO1}$ of control circuit 40 may be electrically coupled to input/output terminal $16_{IO3}$ of charging source 16 through ports $17_3$ and $17_6$ of connector 17, output $40_{O1}$ of control circuit 40 may be electrically connected to input $14_{I2}$ of switching charger 14, output $40_{O2}$ may be electrically connected to input $30_{I2}$ of bypass circuit 30, output $40_{O3}$ may be electrically connected to input $30_{I3}$ of bypass circuit 30. Input $30_{I1}$ of bypass circuit 30 may be electrically connected to output $16_{O1}$ of charging source 16, output $30_{O1}$ of bypass circuit 30 may be electrically connected to input $40_{I2}$ of control circuit 40, and output $30_{O2}$ of bypass circuit 30 may be electrically connected to the positive side electrode or terminal of battery 22. It should be noted that input/output terminals $16_{IO3}$ and $40_{IO1}$ of charging source 16 and control circuit 40, respectively, are bidirectional terminals and are therefore referred to as input/output terminals, i.e., signals may be transmitted from or received at terminals $16_{IO3}$ and $40_{IO1}$.

In accordance with an embodiment, bypass circuit 30 is comprised of a transistor 32 coupled to a transistor 34, where transistor 32 has a control terminal 32G, a current carrying terminal 32D, and a current carrying terminal 32S and transistor 34 has a control terminal 34G, a current carrying terminal 34D, and a current carrying terminal 34S. Current carrying terminal 32S of transistor 32 is connected to current carrying terminal 34S of transistor 34 to form a node 43 and control terminal 32G of transistor 32 is connected to control terminal 34G of transistor 34 to form a node 41. Commonly connected control terminals 32G and 34G are connected to input $30_{I2}$ or, alternatively, serve as input $30_{I2}$ of control circuit 30. Current carrying terminal 32D is connected to input $30_{I1}$ of bypass circuit 30 or, alternatively, serves as input $30_{I1}$ of bypass circuit 30 and current carrying terminal 34D of transistor 34 is connected to the output $30_{O2}$ or alternatively, serves as output $30_{O2}$ of bypass circuit 30. Output $30_{O2}$ is connected to the positive side electrode or terminal of battery 22. Current carrying terminals 32S and 34S may be referred to as current carrying electrodes, source terminals, source electrodes, current conduction electrodes, or current conduction terminals; current carrying terminals 32D and 34D may be referred to as current carrying electrodes, drain electrodes, drain terminals, current conduction electrodes, or current conduction terminals; and control terminals 32G and 34G may be referred to as gate terminals or gate electrodes. Transistors 32 and 34 may be referred to as bypass charging transistors.

Transistor 32 includes a body diode 36 having a cathode 36C connected to current carrying terminal 30D and an anode 36A connected to current carrying terminals 32S and 34S. Transistor 34 includes a body diode 38 having a cathode 38C connected to current carrying terminal 34D and an anode 38A connected to current carrying terminals 32S and 34S. Transistors 32 and 34 are configured so that their sources are commonly connected together and so that the anodes of diodes 36 and 38 are commonly connected together and to the sources of transistors 32 and 34 and the cathodes of diodes 36 and 38 are connected to the drains of transistors 32 and 34, respectively. Configuring diodes 36 and 38 so that anodes 36A and 38A are commonly connected to sources 32S and 34S reduces or stops current flow to battery 22 in the event that a voltage appearing at input $30_{I1}$ of bypass circuit 30 is greater than the voltage of battery 22. It should be noted that configuring diodes 36 and 38 so that cathodes 36C and 38C are commonly connected to sources 32S and 34S and anodes 36A and 38A are connected to drains 32D and 34D, respectively, also reduces or stops current flow to battery 22 in the event that a voltage appearing at input $30_{I1}$ of bypass circuit 30 is greater than the voltage of battery 22. However, configuring diodes 36 and 38 so that anodes 36A and 38A are commonly connected to sources 32S and 34S protects against current flow from control circuit 16 or from battery 22 through resistor 39 in response to switch 35 being closed unless a low impedance fault has occurred in transistor 32 or transistor 34.

Commonly connected source terminals 32S and 34S are connected to a comparator 37 and a resistor 39 through a switch 35. Comparator 37, resistor 39 and switch 35 are configured to serve as a failure detection section of bypass charging circuit 30. Source terminals 32S and 34S may be switchably coupled to resistor 39 through switch 35. More particularly, switch 35 has a conduction terminal 35A connected to commonly connected source terminals 32S and 34S at node 43, a conduction terminal 35B connected to a noninverting input of comparator 37 and to a terminal 39A of resistor 39. Comparator 37 has an inverting input coupled for receiving a reference voltage $V_{FAIL}$ and an output coupled to output $30_{O1}$ or alternatively, that serves as output $30_{O1}$ of bypass charging circuit 30. Resistor 39 has a terminal 39B that is coupled for receiving a voltage such as, for example, operating potential $V_{SS}$. By way of example, operating potential $V_{SS}$ is ground potential. In accordance with an embodiment, the output signal from comparator 37 serves as a bypass circuit status indicator signal. It should be noted that the connection of conduction terminal 35B to the noninverting input of comparator 37 and the connection of a reference voltage to the inverting input of comparator 37 are not limitations of the present invention. For example, conduction terminal 35B may be connected to the inverting input of comparator 37 and a reference voltage may be connected to the noninverting input of comparator 37. In this configuration, the output voltage of comparator 37 may be inverted to provide a bypass circuit status indicator signal before it is transmitted to control circuit 40.

Figure 2:
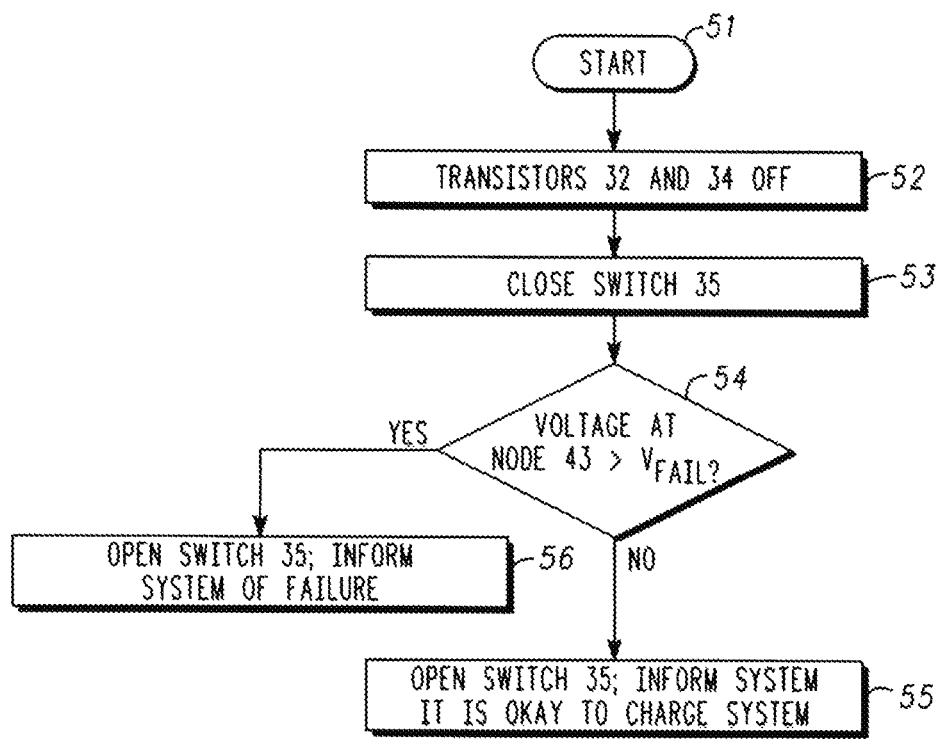
FIG. 2 is a flow chart depicting monitoring a bypass charging circuit for failure in accordance with another embodiment of the present invention.

FIG. 2 is a flow diagram 50 depicting operation of bypass charging circuit 30 in accordance with an embodiment of the present invention. At a start of operation (identified by start oval 51), failure detection and protection circuit 30 may be operating in a normal operating mode, and the voltages at gates 32G and 34G of transistors 32 and 34, respectively, are set so that transistors 32 and 34 are disabled or off, i.e., they are nonconductive or not conducting a significant current in the absence of one or both of transistors 32 and 34 failing. Transistors 32 and 34 being in a nonconducting state is indicated by box 52. In an optional step and in preparation for using bypass circuit 30 to charge battery 22, control circuit 40 may determine whether a charging source such as, for example, charging source 16 and battery 22 are connected to bypass circuit 30. If charging source 16 and battery 22 are not connected to bypass circuit 30, control circuit 14 continues monitoring for their connection to bypass circuit 30. In another optional step, control circuit 40 may determine if charging source 16 or battery 22 are not connected to bypass circuit 30.

Control circuit 40 initiates a check for failure of bypass circuit 30 by closing switch 35 (indicated by box 53), then determining whether the voltage $V_C$ at common connection node 43 (and therefore terminal 35B or the noninverting input of comparator 37) is greater than reference voltage $V_{FAIL}$ (indicated by decision diamond 54). Closing switch 35 connects node 43 to terminal 39A of resistor 39 and to the noninverting input of comparator 37, which generates voltage $V_C$ at the noninverting input of comparator 37. As those skilled in the art appreciate, the voltage at the noninverting input of comparator 37 equals the sum of the voltage across resistor 39 and the voltage coupled to terminal 39B of resistor 39. In accordance with embodiments in which the voltage at terminal 39B is coupled for receiving an operating potential $V_{SS}$, voltage $V_C$ at the noninverting input of comparator 37 equals the sum of the voltage across resistor 39 and operating potential $V_{SS}$. In accordance with embodiments in which operating potential $V_{SS}$ is ground, voltage $V_C$ at the noninverting input of comparator 37 equals the voltage across resistor 39.

In response to the voltage $V_C$ being greater than reference voltage $V_{FAIL}$ (indicated by a YES response at decision diamond 54), control circuit 40 generates a control signal at output $40_{O3}$ to open switch 35 and generates a communication signal indicating failure of bypass circuit 30, i.e., the battery powered system containing bypass charging circuit 30 is informed that bypass charging circuit 30 has failed. In response to $V_C$ being less than reference voltage $V_{FAIL}$ (indicated by a NO response at decision diamond 54), control circuit 40 generates a control signal at output $40_{O3}$ to open switch 35 and generates a communication signal indicating bypass circuit 30 is operating correctly and the system can charge battery 22, i.e., the battery powered system containing bypass charging circuit 30 is configured to charge battery 22. Thus, bypass charging circuit 30 is informed that it is okay to charge the system. It should be noted that control circuit 40 generates a control signal to test bypass circuit 30 after travel adapter 16 has been connected to connector 17 and battery 22 is present.

The fault condition in bypass charging circuit 30 may be caused by transistor 32 not operating correctly, transistor 34 not operating correctly, or both of transistors 32 and 34 not operating correctly.

By way of example, a fault in transistor 34 can be determined by control circuit 40 generating a control voltage at node 41 to keep transistor 34 in a nonconducting state and a control signal that closes switch 35. In response to failure of transistor 34, diode 38 becomes conductive, generating a current at node 43 that flows through transistor 39. In response to the current flowing through resistor 39 a voltage is generated at terminal 39A of transistor 39 and at the noninverting input of comparator 37. Comparator 37 compares the voltage at the noninverting input of comparator 37 with reference voltage $V_{FAIL}$. In response to the failure of bypass circuit 30, voltage $V_{FAIL}$ is greater than the voltage at the noninverting input of comparator, which comparator generates a bypass circuit status indicator signal $V_{IND}$ at output $30_{O1}$ indicating a failure. It should be noted that the voltage at output $30_{O1}$ is bypass charging circuit status indicator signal $V_{IND}$ that is transmitted to input $40_{I2}$ of control circuit 40.

Figure 3:
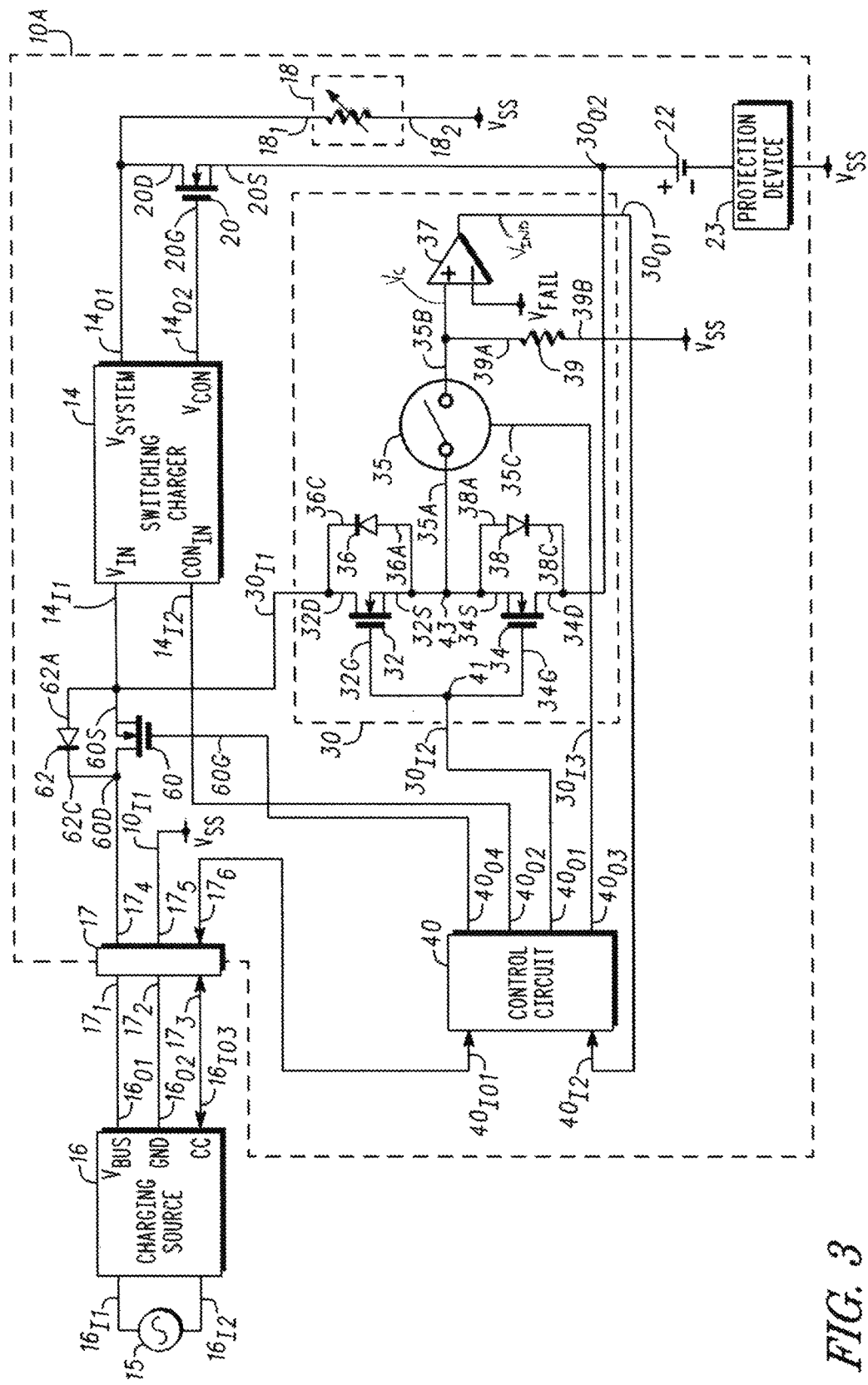
FIG. 3 is a schematic diagram of a bypass charging circuit having a failure detection and protection section in accordance with another embodiment of the present invention.

FIG. 3 is a circuit schematic of a battery powered device 10A comprising a bypass charging circuit 30 that includes a failure detection section and a protection section in accordance with embodiments of the present invention. Battery powered circuit 10A is similar to battery powered device 10 of FIG. 1 except that battery powered device 10A includes a protection section. By way of example, the protection section is comprised of a transistor 60 connected to bypass circuit 30. More particularly, transistor 60 has a control terminal 60G, a current carrying terminal 60D, and a current carrying terminal 60S. Current carrying terminal 60S is connected to input terminal $30_{I1}$ of bypass circuit 30 and to input $14_{I1}$ of switching charger 14, control terminal 60G is connected to output $40_{O4}$ of control circuit 40, and current carrying terminal 60D is configured to be connected to a output $16_{O1}$ of charging source 16, i.e., to a signal source such as, output $V_{BUS}$ of travel adapter 16 through terminals $17_4$ and $17_1$ of connector 17. Current carrying terminal 60S may be referred to as a current carrying electrode, a source terminal, a source electrode, a current conduction electrode, or a current conduction terminal; current carrying terminal 60D may be referred to as a current carrying electrode, a drain electrode, a drain terminal, a current conduction electrode, or a current conduction terminal; and control terminal 60G may be referred to as a gate terminal or a gate electrode.

Transistor 60 includes a body diode 62 having a cathode 62C connected to current carrying terminal 60D and an anode 62A connected to current carrying terminals 60S.

Figure 4:
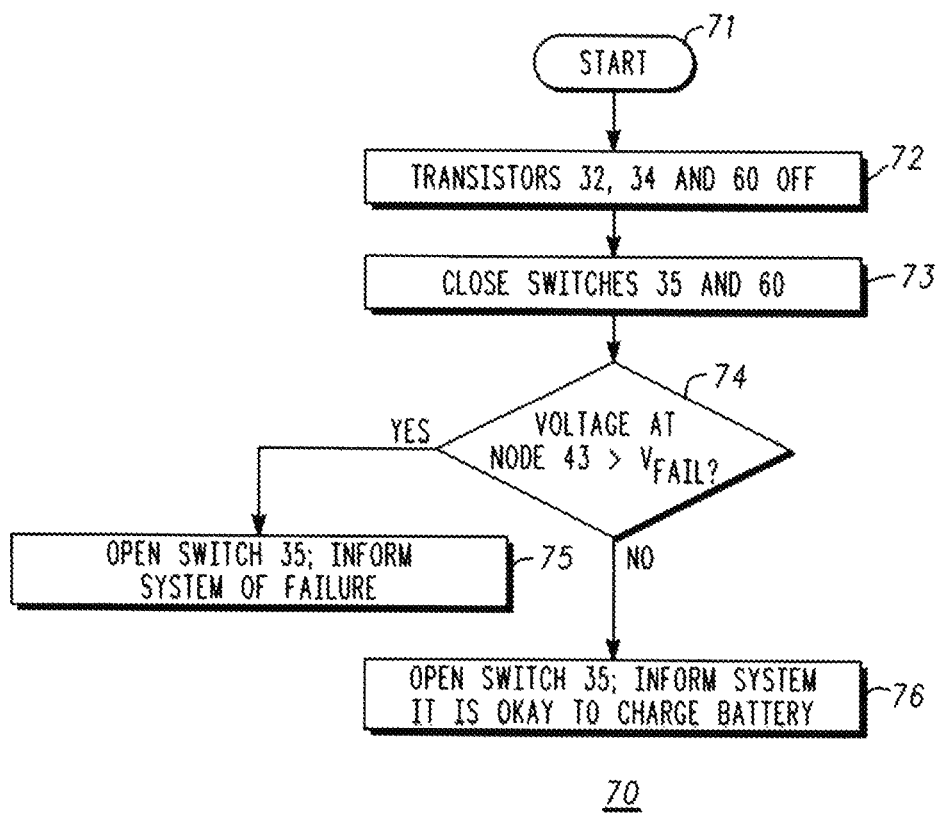
FIG. 4 is a flow chart depicting monitoring a bypass charging circuit for failure in accordance with another embodiment of the present invention.

FIG. 4 is a flow diagram 70 depicting operation of bypass charging circuit 30 in accordance with an embodiment of the present invention. At a start of operation (identified by start oval 71), failure detection and protection circuit 30 may be operating in a normal operating mode and the voltages at gates 32G and 34G of transistors 32 and 34, respectively, are set so that transistors 32 and 34 are disabled or off, i.e., they are nonconductive or not conducting a significant current in the absence of transistors 32 and 34 failing. Similarly, the voltage at gate 60G of transistor 60 may be set so that transistor 60 is disabled or off, i.e., it is nonconductive or not conducting a significant current. Transistors 32, 32, and 60 being in a nonconducting state is indicated by box 72. In an optional step and in preparation for using bypass circuit 30 to charge battery 22, control circuit 40 may determine whether a charging source such as, for example, charging source 16 and battery 22 are connected to bypass circuit 30. If charging source 16 and battery 22 are not connected to bypass circuit 30, control circuit 14 continues monitoring for their connection to bypass circuit 30. In another optional step, control circuit 40 may determine if charging source 16 or battery 22 are not connected to bypass circuit 30.

Control circuit 40 initiates a check for failure of bypass circuit 30 by closing switches 35 and 60 (indicated by box 73), then determining whether the voltage at common connection node 43 (and therefore terminal 35B or the noninverting input of comparator 37) is greater than reference voltage $V_{FAIL}$ (indicated by decision diamond 74). Closing switch 35 connects node 43 to terminal 39A of resistor 39 and to the noninverting input of comparator 37 generating a voltage at the noninverting input of comparator 37. Closing switch 60 connects output $16_{O1}$ to input $14_{I1}$ of switching charger and to input $30_{I1}$ of bypass charging circuit 30. As those skilled in the art appreciate, the voltage at the noninverting input of comparator 37 equals the sum of the voltage across resistor 39 and the voltage coupled to terminal 39B of resistor 39. In accordance with embodiments in which the voltage at terminal 39B is coupled for receiving an operating potential $V_{SS}$, the voltage at the noninverting input of comparator 37 equals the sum of the voltage across resistor 39 and operating potential $V_{SS}$. In accordance with embodiments in which operating potential $V_{SS}$ is ground, the voltage at the noninverting input of comparator 37 equals the voltage across resistor 39.

In response to the voltage at node 43 being greater than reference voltage $V_{FAIL}$ (indicated by a YES response at decision diamond 74), control circuit 40 generates a control signal at output $40_{O2}$ to open switch 35. In addition control circuit 40 generates a control signal at output $40_{O4}$ to turn off transistor 60. Thus, control circuit 40 generates a communication signal indicating failure of bypass circuit 30, i.e., the battery powered system containing bypass charging circuit 30 is informed that bypass charging circuit 30 has failed. In response to the voltage at node 43 being less than reference voltage $V_{FAIL}$ (indicated by a NO response at decision diamond 74), control circuit 40 generates a control signal at output $40_{O2}$ to open switch 35, a control signal to keep transistor 60 on, and a communication signal indicating bypass circuit 30 is operating correctly and the system can charge battery 22, i.e., the battery powered system containing bypass charging circuit 30 is informed that it is okay to charge the system. It should be noted that control circuit 40 generates a control signal to test bypass circuit 30 after travel adapter 16 has been connected to connector 17 and battery 22 is present, but not fully charged.

The fault condition in bypass charging circuit 30 may be caused by transistor 32 not operating correctly, transistor 34 not operating correctly, or both of transistors 32 and 34 are not operating correctly.

By way of example, a fault in transistor 34 can be determined by control circuit 40 generating a control voltage at node 41 to keep transistor 34 in a nonconducting state and a control signal that closes switch 35. In response to failure of transistor 34, diode 38 becomes conductive, generating a current at node 43 that flows through transistor 39. In response to the current flowing through resistor 39 a voltage is generated at terminal 39A of transistor 39 and at the noninverting input of comparator 37. Comparator 37 compares the voltage at the noninverting input of comparator 37 with reference voltage $V_{FAIL}$. In response to the failure of bypass circuit 30, voltage $V_{FAIL}$ is greater than the voltage at the noninverting input of comparator 37, which comparator 37 generates a bypass circuit status indicator signal $V_{IND}$ at output $30_{O1}$ indicating a failure. It should be noted that the voltage at output $30_{O1}$ is bypass charging circuit status indicator signal $V_{IND}$ that is transmitted to input $40_{I2}$ of control circuit 40.

Figure 5:
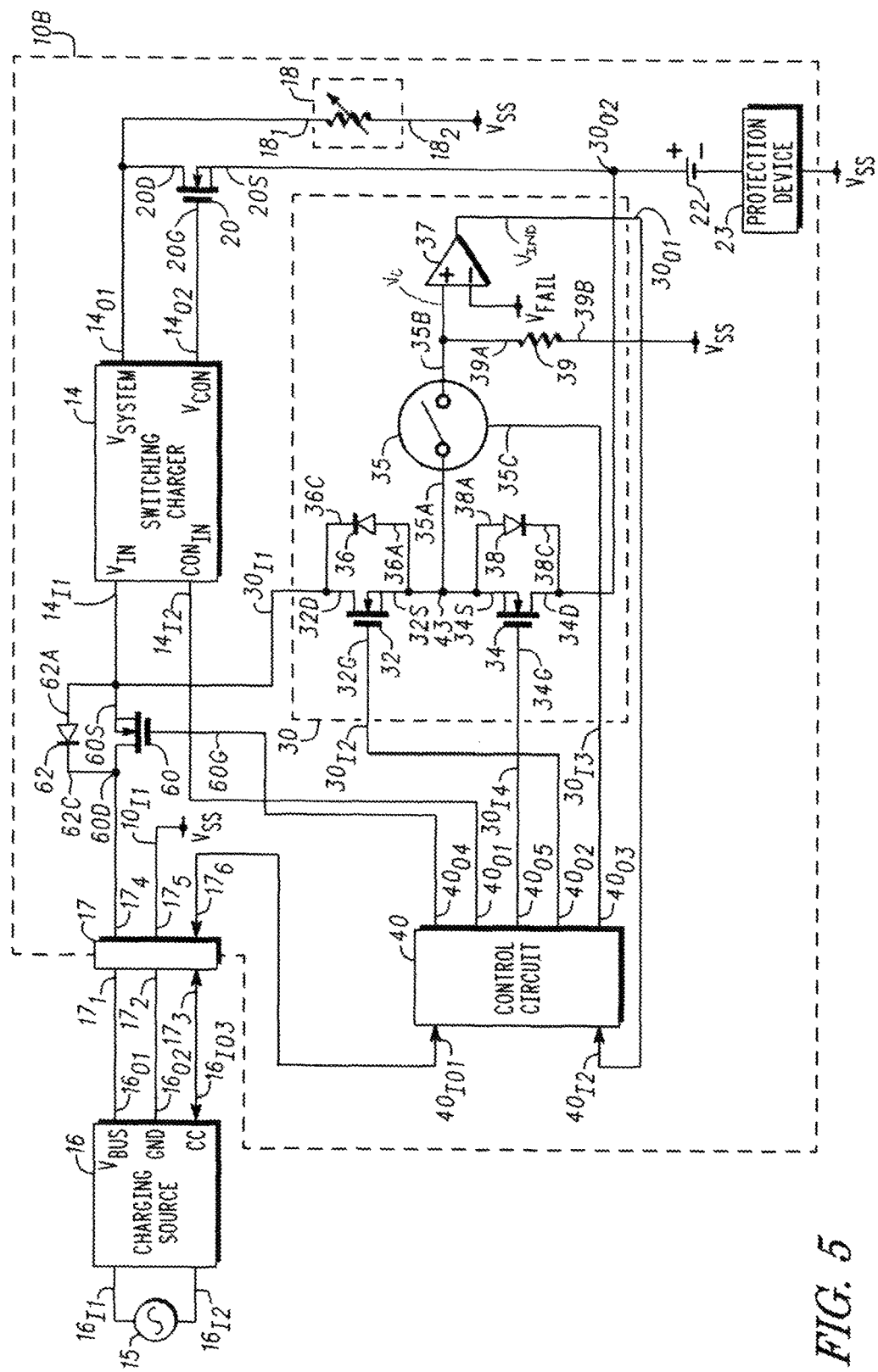
FIG. 5 is a schematic diagram of a bypass charging circuit having a failure detection and protection section in accordance with another embodiment of the present invention.

FIG. 5 is a circuit schematic of a battery powered device 10B comprising a bypass charging circuit 30 that includes a failure detection section in accordance with embodiments of the present invention. Battery powered device 10B may be similar to the battery power devices 10 and 10A of FIGS. 1 and 3, respectively, except that control terminals 32G and 34G of transistors 32 and 34, respectively, are not connected together. Rather, control circuit 40 includes another output $40_{O5}$, where output $40_{O2}$ of control circuit 40 is connected to control terminal 32G of transistor 32 through an input terminal 3014 of bypass charging circuit 30 and output $40_{O5}$ of control circuit 40 is connected to control terminal 34G of transistor 34. Thus, outputs $40_{O2}$ and $40_{O5}$ provide separate control for transistors 32 and 34.

Figure 6:
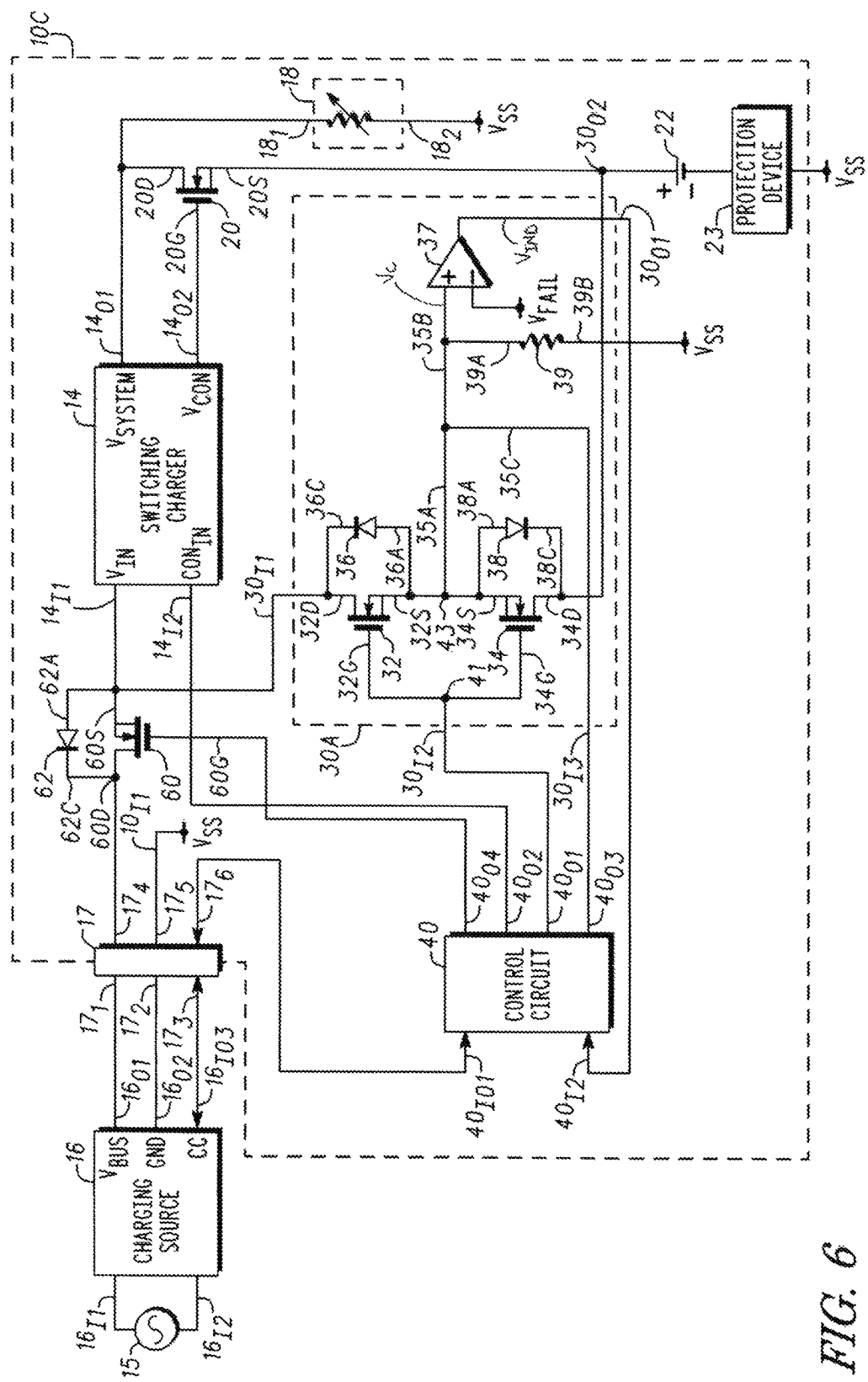
FIG. 6 is a schematic diagram of a bypass charging circuit having a failure detection and protection section in accordance with another embodiment of the present invention.

FIG. 6 is a circuit schematic of a battery powered device 10C comprising a bypass charging circuit 30A that includes a failure detection section in accordance with embodiments of the present invention. Bypass charging circuit 30A is similar to bypass charging circuit 30 except that switch 35 is absent. Accordingly, node 43 is directly connected to terminal 39A of resistor 39 and to the noninverting input of comparator 37.

By now it should be appreciated that a circuit and method have been provided that detect failure of a bypass charging circuit. In accordance with an embodiment, a protection element and a method for protecting a battery or a battery powered device in response to detecting a failure of the bypass charging circuit. Bypass charging circuit 30 includes a pull-down resistor 39 and a comparator 37 connected to the commonly connected source terminals of the bypass transistors of a bypass charging circuit. Optionally, bypass charging circuit 30 further includes a switch 35 coupled between the commonly connected conductors of the bypass charging transistors and the comparator 37. In response to failure of one or more of the bypass transistors, control circuit 40 generates control signals to open switch 35 and turn off transistors 32 and 34. In another embodiment, a circuit element such as, for example, transistor 60 is connected to the bypass charging circuit to protect the battery and provide isolation between a travel adapter and the battery.

Although specific embodiments have been disclosed herein, it is not intended that the invention be limited to the disclosed embodiments. Those skilled in the art will recognize that modifications and variations can be made without departing from the spirit of the invention. For example, switching charger 14, bypass charging circuit 30, control circuit 40, and transistor 20 may be monolithically integrated or one or more of these circuits may be discrete or individual circuit elements. It is intended that the invention encompass all such modifications and variations as fall within the scope of the appended claims.

What is claimed is:

1. A bypass charging circuit that includes a failure detection section, comprising:
    a first transistor having a control terminal, a first current carrying terminal, and a second current carrying terminal;
    a second transistor having a control terminal, a first current carrying terminal, and a second current carrying terminal, the first current carrying terminal of the second transistor directly coupled to the second current carrying terminal of the first transistor to form a first node that is between the first transistor and the second transistor;
    a comparator having a first input, a second input, and an output, the first input of the comparator coupled to the first node and the second input of the comparator coupled for receiving a reference potential; and
    a resistor having a first terminal and a second terminal, the first terminal of the resistor coupled to the first input of the comparator.

2. The bypass charging circuit of claim 1, further including a first switch having a control terminal, a first conduction terminal, and a second conduction terminal, the first conduction terminal of the first switch coupled to the first node and the second conduction terminal of the first switch coupled to the first input of the comparator.

3. The bypass charging circuit of claim 2, further including a third transistor having a control terminal, a first current carrying terminal, and a second current carrying terminal, the first current carrying terminal of the third transistor coupled to the first current carrying terminal of the first transistor.

4. The bypass charging circuit of claim 3, wherein the control terminal of the first transistor is coupled to the control terminal of the second transistor.

5. The bypass charging circuit of claim 4, further including a control circuit having a first input/output, a second input, a first output, a second output, and a third output, wherein the first output of the control circuit is coupled to the control terminals of the first transistor and the second transistor, the second output of the control circuit is coupled to the control terminal of the first switch, and the third output of the control circuit is coupled to the control terminal of the third transistor.

6. The bypass charging circuit of claim 5, further including a first diode having an anode and a cathode, the anode of the first diode coupled to the first current carrying terminal of the third transistor and the cathode of the third diode coupled to the second current carrying terminal of the third transistor.

7. The bypass charging circuit of claim 2, further including a control circuit having a first input, a second input, a first output, a second output, and a third output, wherein the first output of the control circuit is coupled to the control terminal of the first transistor, the second output of the control circuit is coupled to the control terminal of the first switch, the third output of the control circuit is coupled to the control terminal of the second transistor, and the output of the comparator is coupled to the second input of the control circuit.

8. The bypass charging circuit of claim 7, wherein the first input terminal of the control circuit is an input/output terminal.

9. The bypass charging circuit of claim 1, further including:
a first diode having an anode and a cathode, the anode of the first diode coupled to the second current carrying terminal of the first transistor and the cathode of the first diode coupled to the first current carrying terminal of the first transistor; and
a second diode having an anode and a cathode, the anode of the second diode coupled to the first current carrying terminal of the second transistor and the cathode of the second diode coupled to the second current carrying terminal of the second transistor.

10. The bypass charging circuit of claim 1, wherein the second current carrying terminal of the second transistor is configured for coupling to a battery.

11. A method for detecting failure of a bypass charging circuit, comprising:
providing bypass charging transistors comprising first and second transistors, each transistor of the first and second transistors having a control terminal, a first current carrying terminal, and a second current carrying terminal, the first current carrying terminal of the second transistor directly coupled to the second current carrying terminal of the first transistor to form a first node that is between the first transistor and the second transistor;
coupling the first node formed by the bypass charging transistors to a first input of a comparator in response to closing a switch, wherein the comparator and the switch form a portion of a failure detection section;
developing a first voltage at the first input of the comparator in response to closing the switch;
comparing the first voltage with a reference voltage; and
generating a status indicator signal in response to comparing the first voltage with the reference voltage.

12. The method of claim 11, wherein developing the first voltage at the first input of the comparator includes developing the first voltage in response to a current flowing through a resistor.

13. The method of claim 12, wherein generating the status indicator signal includes generating the status indicator signal to indicate failure of the bypass charging circuit in response to the first voltage being greater than the reference voltage.

14. The method of claim 12, wherein generating the status indicator signal includes generating the status indicator signal to indicate the bypass charging circuit is in condition to charge a battery in response to the first voltage being less than the reference voltage.

15. The method of claim 12, further including opening the switch in response to the status indicator signal indicating failure of the bypass charging circuit.

16. The method of claim 12, further including electrically disconnecting the battery charging circuit from a signal source in response to the status indicator signal indicating failure of the bypass charging circuit.

17. The method of claim 16, wherein electrically disconnecting the battery charging circuit from the signal source includes generating a control signal to turn off a transistor between the bypass charging circuit and the signal source.

18. A method for detecting failure of a bypass charging circuit, comprising:
providing first and second transistors, each transistor of the first and second transistors having a control terminal, a first current carrying terminal, and a second current carrying terminal, the first current carrying terminal of the second transistor directly coupled to the second current carrying terminal of the first transistor to form a first node that is between the first transistor and the second transistor;
closing a first switch in response to a control signal, wherein closing the first switch couples the first node to an input of a comparator;
generating a first voltage at the first input of the comparator;
comparing the first voltage at the first input of the comparator with a second voltage at a second input of the comparator;
generating a comparison voltage at the output of the comparator in response to comparing the first voltage with the second voltage;
using the comparison voltage to determine whether the bypass charging circuit has failed.

19. The method of claim 18, further including turning off a third transistor coupled to the first current carrying terminal of the first transistor in response to the comparison signal indicating that the bypass charging circuit has failed.

20. The method of claim 18, wherein generating the first voltage further includes turning off the first transistor and the second transistor.

* * * * *